July 30, 1968  L. MOORE ET AL  3,394,444

METHOD OF APPLYING PROTECTIVE TUBING ON PIPES OR THE LIKE

Filed April 22, 1964

INVENTORS
LOUIS MOORE AND
EDGAR H. BAKER
BY
*Lawrence Rowen*
ATTORNEY

United States Patent Office 3,394,444
Patented July 30, 1968

3,394,444
METHOD OF APPLYING PROTECTIVE TUBING ON PIPES OR THE LIKE
Louis Moore and Edgar H. Baker, both of P.O. Box 2726, Irondale Station, Birmingham, Ala.
Continuation-in-part of application Ser. No. 149,098, Oct. 31, 1961. This application Apr. 22, 1964, Ser. No. 361,850
13 Claims. (Cl. 29—157)

The present case is a continuation in-part of our co-pending application Ser. No. 149,098, entitled "Method of Applying Protective Tubing on Pipe or the Like," filed Oct. 31, 1961, now abandoned.

This invention relates to a method of applying protective coverings to pipes.

More particularly, the invention contemplates the utilization of a protective cover in connection with underground installations where pipes, whether metallic, concrete, or produced from other materials, are of necessity subjected to corrosive and other adverse exterior influences, thereby seriously affecting the life of such installations.

In so-called "hot soils," which may contain acids and/or alkalis, metallic pipes deteriorate with relative rapidity, frequent repairs or replacement being required. Similar considerations apply to metallic, concrete, or other pipes in installations where there are continuing conditions of dampness, whether by reason of substantial rainfall or neighboring naturally occurring flow of water.

It has been proposed, heretofore, to provide such pipes with a plastic protective wrapping, certain polyolefin films being well suited for such purposes. Such methods have not functioned satisfactorily since the wrapping pipes in situ is quite an extensive operation and, except where sealing was employed, seepage with deleterious effects developed at overlapping areas.

Applicants have discovered that these prior art problems can be overcome if plastic tubing is employed as the protective covering and such tubing can be produced with particular ease and economy from such materials as polyethylene, polypropylene, polyvinyl chloride, and the like, tubular films of this character being resistant to acids and alkalis and also being water impermeable.

Corrosive problems as to metallic pipes have been referred to hereabove. An inherent weakness of concrete pipes generally manifests itself in soft-water soils wherein the excessive moisture and pH provide for gradual pipe disintegration. Thus, it will be understood that the plastic material selected for the protective covering will have direct relationship to the type of soil and surrounding conditions in which the pipe will rest.

It is a particular object of the invention to provide a novel method whereby pipes in underground installations, and the like, may be provided with a fluid impermeable protective coating produced from suitable tubular plastic materials.

Further objects and advantages of the invention will be readily apparent from the following specifications, taken in conjunction with the accompanying drawing wherein.

Briefly stated, the present invention contemplates the utilization of a tubular protective pipe covering produced from suitable plastic material, as by an extrusion process or otherwise, and collapsed substantially completely upon its longitudinal axis into a bellows-like or accordion condition to permit the ready placement thereof in surrounding relationship upon a length of pipe to be covered. Desirably the protective covering or tubing should be approximately two feet, or in excess thereof, longer than the section of pipe to be covered to provide for an overlapping joint between opposed extremities of adjacent lengths of protective tubing.

Figure 1:
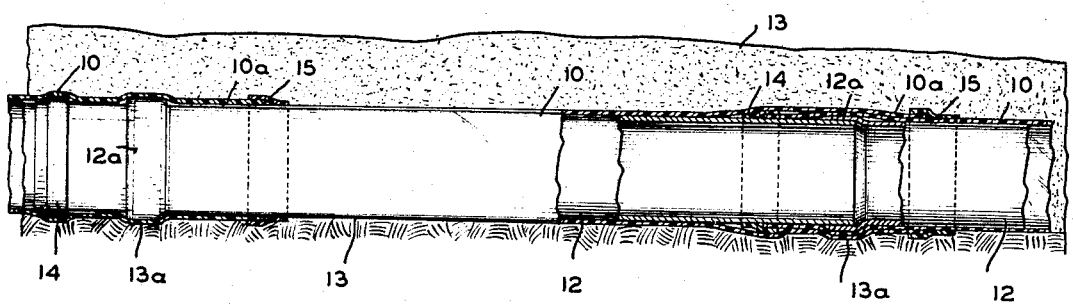
FIGURE 1 is a fragmentary longitudinal sectional view through an underground pipe installation illustrating a plurality of connected pipe lengths with the protective cover of the present invention applied thereto in surrounding relationship, parts being broken away.
Figure 2:
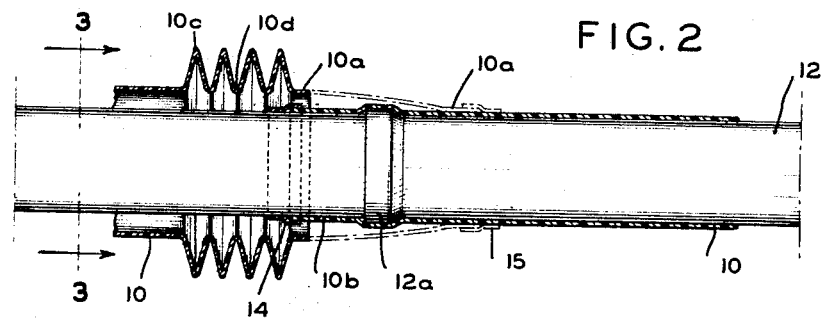
FIGURE 2 is a fragmentary sectional view illustrating somewhat diagrammatically, an initial step in connection with the installation of the protective covering of the present invention.
Figure 3:
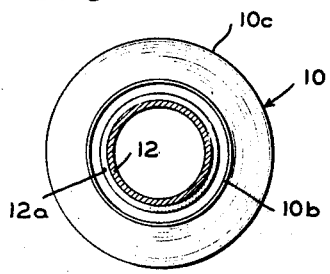
FIGURE 3 is a transverse sectional view taken on the line 3—3 of FIGURE 2.

As shown in the drawing, particular reference being had to FIGURE 1 thereof, the protective tubing of the present invention may be produced from any suitable plastic material, including polyethylene, polypropylene, polyvinyl chloride, and the like, which is resistant to both acids and alkalis and which is impermeable to fluids. Desirably such tubing may be produced by an extrusion process and severed into desired lengths 10, the interior diameter thereof having relationship to the exterior diameter of the pipe to be covered. It also is contemplated that such protective tubing may be produced from a continuous length of plastic film having the longitudinal edges thereof united, as by a heat-sealing operation where the film is thermoplastic, as is well known in this art.

Figure 4:
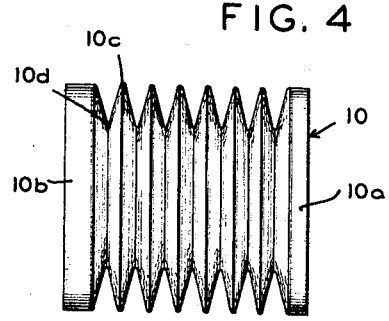
FIGURE 4 is a side elevational view illustrating, somewhat diagrammatically, a section of tubular protective cover in longitudinally collapsed condition.
Figure 5:
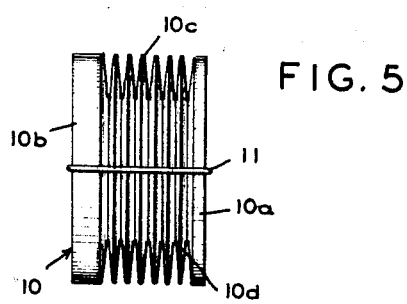
FIGURE 5 is a side elevational view, similar to FIGURE 4, of a section of protective tubing collapsed and secured by a tie cord or tape.

For commercial use, in accordance with the present invention, each length of tubing 10 is collapsed upon itself, as illustrated diagrammatically in FIGURES 4 and 5 of the drawing, along its longitudinal axis, to provide a bellows or accordion like configuration, except for the free extremities 10a and 10b. In this substantially completely collapsed condition there will be alternating peaks and valleys, or high and low points, 10c and 10d and, since the tubing with which we here are concerned has a high degree of flexibility, these accordion folds cannot be expected to provide any substantial degree of regularity but will be achieved at random, it only being necessary that the collapsed annulus thus produced provide a free central opening of sufficient diameter to pass freely over the pipe to be covered.

A partially collapsed length of tubing has been illustrated in FIGURE 4 while a further collapsed length is shown in FIGURE 5 with a suitable fastening element or tie cord 11, or the like, applied thereto to provide for convenient handling.

It also is within the scope of the present invention to produce the tubular covering by a molding operation in which event a true bellows-type structure will be created, having self-sustaining characteristics and readily expansible to an elongated tube having an interior diameter corresponding to that of the free extremities 10a and 10b.

A collapsed annulus of the character described may be placed upon a length of pipe to be covered, in encircling relationship, with particular facility, and then extended to full length and secured in completely protective position thereby obviating prior art difficulties where attempts have been made to utilize a flattened length of tubular material for present purposes.

Installation of the protective covering preferably is accomplished in situ and means is provided for sealing at least one extremity of the protective tubing to the pipe per se and for sealing the opposed extremities of adjacent lengths of said tubing to each other, thereby providing a completely sealed covering for the pipe as will be described more fully hereafter.

As illustrated fragmentarily and diagrammatically in FIGURE 1 of the drawing, the pipe 12 to be covered may be produced from any suitable material and of any exterior and interior diameters in accordance with the specific requirements inherent to the end use or function of the installation. In the illustrative embodiment shown there are a plurality of interconnected pipe lengths 12, each such length including an enlarged bell-shaped extremity 12a for the convenient reception of the opposed extremity or spigot end of the next adjacent pipe length 12, as is well known in this art, to provide a relatively smooth and continuous interior surface with free flow therethrough.

A trench or the like 13 has been illustrated, and the pipe installation, as well as the protective covering thereof, is accomplished therein. To facilitate wrapping at each pipe section joint, the trench may be provided with relatively shallow bell depressions or holes indicated at 13a.

With the initial pipe section 12 in place, a collapsed length of protective tubing 10 is placed upon the next adjacent length of pipe 12 which is suitably supported, as by a sling or the like, preparatory to lowering thereof into the trench 13. The pipe length 12 is then lowered into the trench, the spigot end thereof is seated within the bell extremity 12a of the preceding pipe length, and the pipe joint is made up in normal fashion. The sling then is removed from adjacent the central portion of the pipe length being covered and the hook is enagaged within the free bell cavity and this extremity of the pipe length is raised a sufficient distance, three to four inches will be entirely adequate, to permit the collapsed protective tubing to be drawn or slipped along the barrel of the pipe section to its complete or original uncollapsed length with enough of the tubular covering being retained, in bunched-up accordion condition at each extremity to overlap one foot, or possibly more, of the extremity of the adjacent or adjoining pipe section. As stated hereabove, the length of each length of protective tubing 10 is two to three feet (or more) greater than the length of the pipe section to be covered, and these dimensions may vary through a particularly extensive range; thus, ample material is provided for the overlap contemplated.

The adjacent extremity 10b of the tubular covering 10 is then pulled over the bell of the pipe length to a position in surrounding relationship with respect to the spigot extremity of the adjoining pipe length 12 and a suitable plastic adhesive tape 14 is employed to seal the extremity of the tubular covering 10 to the surface of the pipe section 12. Desirably such tape should have a width approximating 2", include a plastic backing and have adhesive characteristics insuring ready bonding with both pipe surface and tubular material employed. Such tapes are commercially available, as "Polyken 900" (polyethylene) "Scotchrap No. 50" (polyvinyl), or the like, and three circumferential turns thereof are viewed as entirely effective.

To make the overlap joint, thus completing the seal, the collapsed extremity 10a of the adjacent tubular covering 10 is pulled over the covered bell 12a of the initial pipe length 12, folded around the adjacent pipe portion and sealed in place behind the bell portion, as indicated at 15, utilizing several (three, preferably) circumferential turns of the 2" plastic adhesive tape referred to hereabove.

Fittings, valves, hydrants, etc., can be protectively covered by splitting the tubular material, as may be necessary, and utilizing plastic adhesive tape for effecting a seal. The protective covering of bends, reducers, and offsets occurring in pipe systems will present no problems as the tubular material of the present invention may be employed with equal facility in connection with such departures from a continuous length of axially aligned pipe. It should be remembered that all fittings which may require concrete backing should be wrapped completely prior to the pouring of the concrete block.

It will be understood that, in the practice of the present invention, the wrap or covering, particularly on the barrel portions of the pipe sections will be relatively loose, thus permitting the plastic covering material to shift with the soil during filling of the trench or installation, as well as in the event of any subsequent underground movement, thereby eliminating possibility of damage by shearing, abrasion, or the like.

As to the characteristics of the protective or tubular covering material, a thickness on the order of 8 mils has been found to be highly satisfactory. Where polyethylene film is employed, such film should be produced from virgin polyethylene having characteristics present in "U.S.I. Petrothene" or "Du Pont Alathon" resins. Films of this character have a tensile strength of from 1200 to 2500 p.s.i. with an elongation factor of up to 600% and are admirably suited for present purposes.

In such polyethylene films, the dielectric strength of 500 to 850 volts per mil of thickness provides insulating characteristics which exceed vastly the esbtablished requirements of underground installations. There is no known corrosive soil condition which will affect polyethylene since this material is chemically inert and, with a moisture absorption factor of less than 0.01% in 24 hours, such films constitute a particularly effective seal against penetration by water or vapor. Further, there are no volatile constituents in polyethylene which may escape and result in loss of ductility. Other advantages include the fact that in the event of any mischance which results in film rupture after installation, with application at the trench site likelihood of damage in transit is eliminated, whereby ground water enters between the film and pipe, this space becomes filled and reaction is, of necessity, spread over a relatively large area. Under such conditions, corrosion will cease when the original quantity of electrolyte is neutralized.

There has thus been described a novel protective pipe covering, and a novel method of installation, whereby pipes and the like in underground or similar installations may be effectively guarded with particular economy against damage resulting through corrosion, deterioration or other adverse exterior influences. It will be obvious to those skilled in this art that various changes may be made in the invention without departing from the spirit and scope thereof and therefore the invention is not considered limited by that which is shown in the drawing and described in the specification and reference is had to the claims for summaries of the essentials of the invention, of the novel features of constructions, and novel method of installation for all of which protection is desired.

What is claimed is:

1. A method of applying a protective covering to a pipe installation which comprises a plurality of connected pipe sections, said method including the steps of placing upon the first pipe section in surrounding relationship with respect thereto a longitudinally collapsed first length of tubular plastic material which is of greater extended length than that of the pipe section to be covered; sealing the trailing extremity of said tubular material to the peripheral surface of said pipe installation adjacent the trailing extremity of said first pipe section; longitudinally expanding said length of tubular material toward the leading end of said first pipe section; placing a longitudinally collapsed second length of tubular plastic material upon the second pipe section in surrounding relationship with respect thereto; creating a joint between the trailing end of the second pipe section and the leading end of said first pipe section; further longitudinally expanding the leading extremity of said first length of tubular material to cover said joint; sealing the leading extremity of said first length to the adjacent peripheral surface of said second pipe section; expanding the trailing end of the second length of tubular material on said second pipe section rearwardly beyond the joint between said first and adjacent second pipe sections; sealing the trailing extremity of said second length of tubular material to the adjacent peripheral surface of the tubular material on said first pipe section; expanding said second length of tubular material toward the leading end of the second pipe section; and repeating the operative steps set forth for each successive pipe section.

2. The method of claim 1 where the seals between the tubular plastic material and the peripheral surface of a pipe section, and the seals between overlying layers of tubular plastic material, is created by at least one turn of an adhesive tape of sufficient width to bond to the extremity of the tubular material and to the surface to which said material is to be sealed.

3. The method of claim 1 where said tubular plastic material is a polyolefin.

4. The method of claim 1 where said tubular material is an extruded polyolefin.

5. The method of claim 4 where said tubular material is polyolefin having a thickness on the order of 8 mils.

6. The method of claim 5 where the tubular material is polyethylene.

7. The method of claim 1 where said protective covering is applied in situ to an underground pipe installation.

8. The method of protecting the outer surface of a pipe which includes the steps of placing upon said pipe in surrounding relationship with respect thereto a length of tubular plastic material which has been collapsed along its longitudinal axis into a bellows-like condition; sealing the trailing extremity of said collapsed tubular material to the peripheral surface of said pipe adjacent the trailing extremity thereof; partially longitudinally expanding said collapsed length of tubular material to a length slightly less than the complete length thereof; placing a second collapsed length of tubular material upon said pipe in surrounding relationship with respect thereto; sealing the trailing extremity of said second collapsed length of tubular material to the peripheral surface of said pipe at a point adjacent the leading extremity of said partially expanded first length of tubular material; further expanding the leading extremity of said first length of tubular material to surround the sealed trailing extremity of said second length of tubular material; sealing the leading extremity of said first length of tubular material to the peripheral surface of the underlying length of tubular material; and repeating the operative steps for each successive length of tubular material.

9. The method of claim 8 where the seals between the tubular plastic material and the perihperal surface of a pipe section, and the seals between overlying layers of tubular plastic material, is created by at least one turn of an adhesive tape of sufficient width to bond to the extremity of the tubular material and to the surface to which said material is to be sealed.

10. The method of claim 8 where said tubular plastic material is a polyolefin.

11. The method of claim 8 where said tubular material is an extruded polyolefin.

12. The method of claim 11 where said tubular material is polyolefin having a thickness on the order of 8 mils.

13. The method of claim 12 where the tubular material is polyethylene.

References Cited

UNITED STATES PATENTS

| | | | |
|---|---|---|---|
| 2,007,969 | 7/1935 | Grodsky | 61—72.1 |
| 2,272,704 | 2/1942 | Harding. | |
| 2,907,351 | 10/1959 | Rohrback et al. | |
| 3,126,624 | 3/1964 | Mirsky et al. | 29—450 |
| 3,049,801 | 8/1962 | Workman | 29—450 |
| 3,065,531 | 11/1962 | Rosenthal | 29—450 |
| 2,396,059 | 3/1946 | Roberts | 138—122 |
| 2,622,623 | 12/1952 | Michaudet | 138—122 |

CHARLIE T. MOON, *Primary Examiner.*

L. J. LENNY, *Examiner.*